(12) United States Patent
Inanc et al.

(10) Patent No.: US 10,585,209 B2
(45) Date of Patent: Mar. 10, 2020

(54) GAMMA RAY SPECTRA CONTRAST SHARPENING

(71) Applicant: Baker Hughes, a GE company, LLC, Houston, TX (US)

(72) Inventors: Feyzi Inanc, Spring, TX (US); Toyli Anniyev, The Woodlands, TX (US); Maxim Vasilyev, The Woodlands, TX (US); David Chace, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 16/132,978

(22) Filed: Sep. 17, 2018

(65) Prior Publication Data

US 2019/0086576 A1    Mar. 21, 2019

Related U.S. Application Data

(60) Provisional application No. 62/564,730, filed on Sep. 28, 2017, provisional application No. 62/560,126, filed on Sep. 18, 2017.

(51) Int. Cl.
*G01V 5/12*    (2006.01)
*G01V 5/14*    (2006.01)
*G01V 5/10*    (2006.01)
*G01V 5/04*    (2006.01)

(52) U.S. Cl.
CPC ............. *G01V 5/125* (2013.01); *G01V 5/04* (2013.01); *G01V 5/102* (2013.01); *G01V 5/145* (2013.01)

(58) Field of Classification Search
CPC ......... G01V 5/125; G01V 5/102; G01V 5/145

USPC ....................................................... 250/269.2
See application file for complete search history.

(56) References Cited

U.S. PATENT DOCUMENTS

| 3,321,625 A | 5/1967 | Wahl |
| 3,566,177 A | 2/1971 | Daniel |
| 4,390,783 A | 6/1983 | Grau |
| 4,570,067 A | 2/1986 | Gadeken |

(Continued)

OTHER PUBLICATIONS

PCT Application No. PCT/US2018/051574 International Search Report dated May 21, 2019.

*Primary Examiner* — David P Porta
*Assistant Examiner* — Gisselle M Gutierrez
(74) *Attorney, Agent, or Firm* — Mossman, Kumar & Tyler PC

(57) ABSTRACT

Methods and apparatus for estimating parameters of interest of a volume in an earth formation from a response spectrum representing radiation information obtained by a radiation detector in a borehole intersecting the volume responsive to nuclear phenomena in the volume, the response spectrum including spectral distortion resulting i) environmental conditions in the formation, or ii) deterioration of at least one component of the radiation detector. Methods include recovering an enhanced response spectrum estimating the true spectrum, comprising mitigating the spectral distortion by applying at least one contrast sharpening mask to the response spectrum. The at least one contrast sharpening mask may comprise at least a low pass smoothing mask subtracted from a unity mask which when applied to the response spectrum obtains high-frequency data and adds the high-frequency data to the response spectrum. The response spectrum may be a gamma ray spectrum.

18 Claims, 11 Drawing Sheets

(56) References Cited

U.S. PATENT DOCUMENTS

| | | | |
|---|---|---|---|
| 4,810,459 A | 3/1989 | Fontenot | |
| 4,910,397 A | 3/1990 | Mills, Jr. et al. | |
| 5,684,299 A | 11/1997 | DasGupta | |
| 5,789,752 A | 8/1998 | Mickael | |
| 6,175,599 B1* | 1/2001 | Lyon | H04L 27/2071 375/261 |
| 9,341,737 B2 | 5/2016 | Inanc et al. | |
| 2006/0065824 A1* | 3/2006 | Mickael | E21B 47/0005 250/252.1 |
| 2009/0190837 A1* | 7/2009 | Forutanpour | G06K 9/4609 382/203 |
| 2009/0248309 A1* | 10/2009 | Neville | G01V 5/04 702/8 |
| 2010/0214348 A1* | 8/2010 | Miyahara | B41J 2/195 347/19 |
| 2010/0232797 A1* | 9/2010 | Cai | H04J 14/02 398/79 |
| 2011/0029246 A1* | 2/2011 | Nikitin | G01V 5/04 702/8 |
| 2014/0100785 A1* | 4/2014 | Sloan | G01T 7/005 702/8 |
| 2014/0264049 A1* | 9/2014 | Yocum | H01L 31/117 250/370.14 |
| 2016/0370494 A1 | 12/2016 | Zhou et al. | |
| 2017/0168192 A1* | 6/2017 | Vasilyev | G01V 5/102 |
| 2017/0362926 A1* | 12/2017 | Difoggio | G01N 29/4436 |
| 2018/0023382 A1* | 1/2018 | Ringer | E21B 44/00 175/50 |

\* cited by examiner

GAMMA RAY SPECTRA CONTRAST SHARPENING

CROSS-REFERENCE TO RELATED APPLICATIONS

This application claims priority from U.S. Provisional Application Ser. No. 62/564,730, filed Sep. 28, 2017 and from U.S. Provisional Application Ser. No. 62/560,126, filed Sep. 18, 2017, the entire disclosure of which is incorporated herein by reference in its entirety.

FIELD OF THE DISCLOSURE

In one aspect, this disclosure generally relates to methods, devices, and systems for estimating at least one parameter of interest relating to a volume of matter using nuclear radiation based measurements.

BACKGROUND OF THE DISCLOSURE

Using nuclear techniques to investigate volumes of either organic or inorganic matter is well known. For example, naturally radioactive elements are commonly found in earth formations in various proportions, depending on the type of lithology and other factors. Radioactive isotopes of potassium, uranium, and thorium are typical regularly occurring naturally radioactive elements commonly quantified in the petroleum industry.

A rigid or non-rigid conveyance device is often used to convey one or more nuclear radiation detectors into a borehole intersecting the earth formation, often as part of a tool or a set of tools. There, the detector(s) may be used to estimate radiation associated with a volume of interest of the earth formation by generating a response to the one or more types of nuclear radiation detected. The response may be indicative of the nuclear radiation (e.g., gamma rays) present in the near-borehole environment during measurement. This response may then be used to estimate a parameter of interest of the volume. In nuclear logging, additional radioactive isotopes may be generated by providing radiation (e.g., neutron bombardment) to the formation. The detected nuclear radiation may be expressed as an energy spectrum (the "response spectrum"). "Response spectrum" refers to not only the response spectrum as originally acquired, but also after contrast enhancement, corrections, or pre-processing is applied.

Oil well logging has been known for many years and provides an oil and gas well driller with information about the particular earth formation being drilled. One or more parameters of interest of the earth formation obtained as above may relate to hydrocarbon exploration or production. For example, the parameter of interest may provide indications of the location and extent of hydrocarbons in a given earth formation.

SUMMARY OF THE DISCLOSURE

In aspects, the present disclosure is related to methods and apparatuses for estimating at least one parameter of interest of a volume of interest of an earth formation using nuclear radiation based measurements.

Aspects may include methods, systems, and devices for estimating at least one parameter of interest of a volume in an earth formation from a response spectrum representing radiation information obtained by a radiation detector in a borehole intersecting the volume responsive to nuclear phenomena in the volume. The response spectrum may include spectral distortion resulting from degraded performance of the radiation detector. The spectral distortion is caused by at least one of: i) environmental conditions in the formation, and ii) deterioration of at least one component of the radiation detector. The spectral distortion may comprise a difference between the response spectrum and a true, non-distorted, spectrum accurately reflecting the nuclear phenomena.

Methods include recovering an enhanced response spectrum estimating the true spectrum, comprising mitigating the spectral distortion by applying at least one contrast sharpening mask to the response spectrum. The at least one contrast sharpening mask may comprise at least a low pass smoothing mask subtracted from a unity filter which when applied to the response spectrum obtains high-frequency data and adds the high-frequency data to the response spectrum. The response spectrum may be a gamma ray spectrum. The response spectrum may be indicative of gamma ray interactions including at least one of i) Compton scattering, ii) photoelectric effect, and iii) pair production. Methods may include selecting the at least one contrast sharpening mask in dependence upon scintillator resolution.

The true spectrum may include at least one feature absent from the response spectrum. Mitigating the spectral distortion may include restoring the at least one feature to the enhanced response spectrum. The at least one feature may include a response curve peak at a characteristic energy associated with a reference sample. The parameter of interest may be at least one of: i) the concentration of at least one chemical element in the volume; ii) a carbon-oxygen ratio of the volume; iii) a physical characteristic of the analysis volume; iv) spectral calibration information.

Methods may include deconvolving the enhanced response spectrum. Deconvolving the enhanced response spectrum may include determining a best fit to the enhanced response spectrum using a combination standard spectra. Deconvolving the enhanced response spectrum may include using one of i) a linear; and ii) a non-linear weighted least squared error minimization technique.

Methods may include obtaining the response spectrum for the volume of interest. Obtaining the response spectrum for the volume of interest may include making radiation measurements using the radiation detector. Methods may include conducting further operations in the formation in dependence upon the enhanced gamma ray spectrum. The further operations may include at least one of: i) geosteering; ii) drilling at least one borehole in the formation; iii) performing measurements on the formation; iv) estimating at least one parameter of interest of the formation; v) installing equipment in a borehole in the formation; vi) evaluating the formation; vii) optimizing development in the formation; viii) optimizing development in a formation related to the formation; ix) optimizing exploration in the formation; x) optimizing exploration in a formation related to the formation; xi) producing at least one hydrocarbon from the formation.

Embodiments may employ a pulsed neutron source. The information processing device may comprise at least one processor; and a memory storage medium accessible to the at least one processor. Methods as described above implicitly utilize at least one processor. Some embodiments include a non-transitory computer-readable medium product accessible to the processor and having instructions thereon that, when executed, causes the at least one processor to perform methods described above. Apparatus embodiments may include, in addition to specialized borehole measurement equipment and conveyance apparatus, at least one processor and a computer memory accessible to the at least one processor comprising a computer-readable medium having instructions thereon that, when executed, causes the at least one processor to perform methods described above.

Examples of the more important features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

Figure 1A:
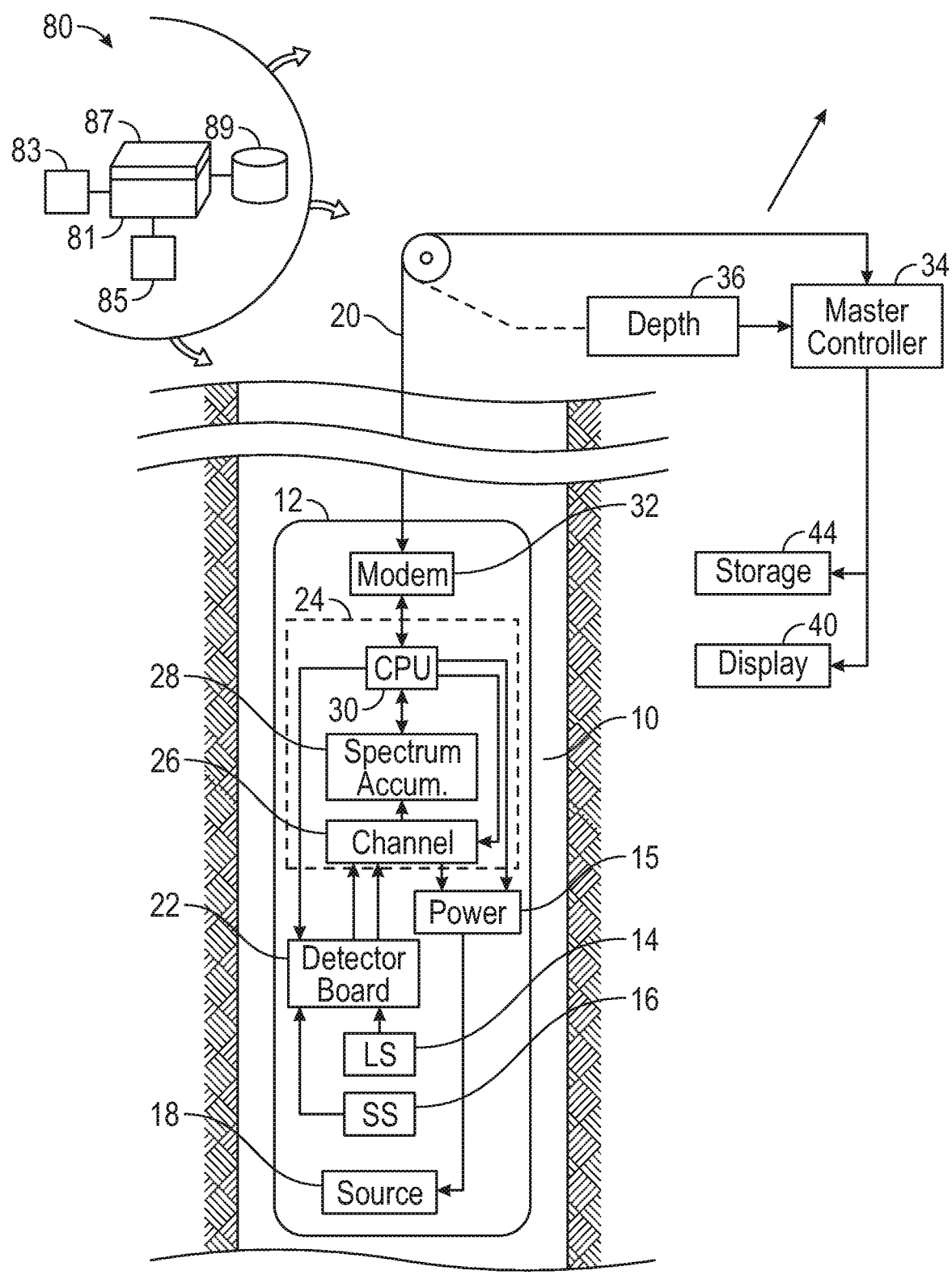
FIG. 1A is a schematic diagram of an example system in accordance with embodiments of the present disclosure.

In aspects, this disclosure relates to estimating at least one parameter of interest of a volume of matter using measurements of nuclear radiation in a borehole. The volume may be an earth formation, such as, for example, an earth formation surrounding a borehole. The parameter of interest may be a physical characteristic of the volume, such as, for example, elemental concentrations of naturally occurring radioactive material in the volume, lithology of a subterranean formation, and so on. In some aspects, this disclosure relates to estimating a parameter of interest from a response spectrum estimated from the detected radiation.

In many instances, the information used for these estimations may be acquired by tools deployed into a borehole intersecting one or more formations of interest. Due to age, wear, overuse, changes in temperature, changes in pressure, and other environmental variations in the borehole, performance of components of the radiation detector may degrade. Left unaddressed, this condition may result in spectral distortions in the response spectrum, either in the short or long term (or both). Aspects of the present disclosure mitigate the spectral distortion.

For context, an exemplary system for deploying and using such tools to acquire this information is described below with respect to FIGS. 1A & 1B. The formation may be exposed to energy from a radiation source. Downhole tools may include this radiation source and one or more detectors. The radiation source may include, but is not limited to, one or more of a neutron source, a gamma-ray source, and an x-ray source. The detectors may be used to detect radiation from the formation, though the detectors are not limited to detecting radiation of the same type as emitted by the radiation source.

In one common application of downhole radiation detection, the energy spectrum caused by radioactive decay of radionuclides may be used to estimate parameters of interest of an earth formation. The energy spectrum may be expressed in terms of magnitude (e.g., gamma ray counts per period of time) as a function of energy. The radioactive decay of radionuclides may produce nuclear radiation that may be detected by radiation detectors. Radionuclides may include naturally occurring radionuclides (such as potassium-40, and the uranium and thorium series), which exist in the earth formation, and activated radionuclides, which may include radionuclides activated from the irradiation of nuclides with nuclear radiation.

One or more of the detectors may include a scintillator component comprising a radiation responsive element (for example, a scintillator crystal or the like) which produces light scintillations in response to absorbing radiation (e.g., neutrons, gamma rays, etc.), and at least one light responsive device (e.g., a photomultiplier tube, other photomultiplier device, charge coupled silicon device, and so on) configured to produce an output representative of the respective light scintillations.

As described above, radiation information obtained in the borehole has many practical applications. In one example application, a scintillator as described above may be employed in spectral gamma ray logging to estimate elemental concentrations of potassium-40, and the uranium and thorium series (collectively, 'KUT concentrations') in a volume. Because these elements emit gamma radiation at specific characteristic energies, components of radiation from each of the elements contributing to the total gamma ray spectrum may be determined by identifying the characteristic energies from a response spectrum using known methods of decomposition, and thereby estimate concentrations of each element in the volume. Other naturally radioactive or activated elements may also be similarly identified. The elemental concentrations may then be subjected to various forms of processing and analysis to predict the location and extent of hydrocarbons in the formation.

The identification of characteristic energy peaks produced by each element plays a key role in deconvolution. Thus, for spectral gamma ray logging, accurate identification of energy peaks is highly desirable. General embodiments of the present disclosure include methods of reversing distortion from component performance degradation to recover an enhanced response spectra estimating the true spectra—that is, a spectra which accurately reflects the nuclear phenomena in the volume. Distortion reversal techniques of the present disclosure may restore features (e.g., peaks) in the response curve which are lost due to degraded component performance.

In a typical environment, the distorted spectra can be expressed as a deconvolution process as shown in equation (1):

$$S'(E) = \int S(E')F(E'-E)dE' \qquad (1)$$

S(E) in Eq. (1) is the true spectrum as measured without degradation. F(E'-E) is the kernel incorporating the influence of various distorting factors. S'(E) is the distorted spectrum, which is acquired via measurement by a downhole tool. So, S(E) is the spectrum not influenced by those distortions; it is desirable to estimate this spectrum for more accurate measurements. Typically, the kernel seen in Eq. (1) is treated as a Gaussian. With that, Eq. (1) may be discretized into Eq. 2:

$$S'_i = \Sigma S_j F_{ij} \text{ where } i=1 \ldots N \quad (2)$$

Eq. (2) can be written as a set of algebraic equations:

$$[F][S]=[S'] \quad (3)$$

In Eq. (3), F may be a Gaussian matrix operating on the spectrum. For cases where the data is smooth and data noise is not an issue, it is possible to calculate the initial spectrum from the distorted spectrum by inverting the Gaussian matrix.

$$[S]=[F]^{-1}[S'] \quad (4)$$

However, the inversion shown in Eq. (4) is difficult to implement due to noise issues and increases the high frequency components of the spectrum. Problematically, the inversion converts the spectrum into a noisy spectrum which is often unusable, particularly if the distortion has been represented by a Gaussian kernel.

An energy spectrum incident on an instrument in a borehole and produced from radioactive decay of radionuclides within a volume of interest of an earth formation may be used to estimate parameters of interest of the formation. The energy spectrum may be expressed in terms of magnitude (e.g., gamma ray counts per period of time) as a function of energy. The radioactive decay of radionuclides may produce nuclear radiation that may be detected by radiation detectors. Radionuclides may include naturally occurring radionuclides, such as potassium-40, and the uranium and thorium series, which exist in the earth formation and activated radionuclides, which may include radionuclides activated from the irradiation of nuclides with nuclear radiation.

One or more nuclear radiation detectors disposed along the downhole tool may be configured to generate a response indicative of the nuclear radiation detected. The detected nuclear radiation may include gamma rays and neutrons. Since the energy spectrum may include energy spectrum components from multiple radionuclides, the nuclear radiation information may be separated to identify the energy spectrum components contained with the energy spectrum.

The separate energy spectrum components may be used for estimating the concentration of at least one radionuclide in the volume of interest of the earth formation. The estimated concentration of the at least one radionuclide may be used for estimating at least one parameter of interest of the volume of interest of the earth formation. A description for some embodiments estimating the at least one parameter of interest follows below. The estimation may be performed in multiple stages, such that an earlier stage may process the information for a later stage. One of the stages may include a technique of elemental standards-based spectral decomposition (also known as a yields method).

Prior art methods exist for determining attributes of a formation from logging results. See, for example, U.S. Pat. No. 3,321,625 to Wahl, U.S. Pat. No. 3,566,177 to Larson, U.S. Pat. No. 4,390,783, to Grau, U.S. Pat. No. 4,570,067 issued to Gadeken, U.S. Pat. No. 4,810,459 to Fontenot, U.S. Pat. No. 4,910,397 to Mills, Jr. et al., U.S. Pat. No. 5,684,299 to DasGupta, U.S. Pat. No. 5,789,752 to Mickael et al, and U.S. Pat. No. 9,341,737 to Inanc et al., all incorporated herein by reference in their entirety.

Each of the embodiments herein may be used in a variety of settings in both drilling and non-drilling environments. In some implementations, the disclosed embodiments may be used in connection with LWD or MWD tools as part of a drilling system, while in other implementations embodiments may be incorporated into other types of well tools, such as wireline or slickline systems.

Referring now to the drawings in more detail, and particularly to FIG. 1A, there is illustrated a nuclear well logging configuration in accordance with the present invention. Well 10 penetrates the earth's surface and may or may not be cased depending upon the particular well being investigated. Disposed within well 10 is subsurface well logging instrument 12. The system diagramed in FIG. 1A is a microprocessor-based nuclear well logging system using multi-channel scale analysis for determining the timing distributions of the detected gamma rays. Well logging instrument 12 includes long-spaced (LS) detector 14, short-spaced (SS) detector 16 and pulsed neutron source 18. In an exemplary embodiment, LS and SS detectors 14 and 16 may be comprised of LYSO ($Lu^1$-$xYxSi^2O^5$) crystals coupled to photomultiplier tubes. In other examples, crystals of CsI (Na), NaI(Tl), BGO or GSO may be used, or joined fiber materials may be employed which are made up of fibers comprising crystalline scintillation materials (e.g., LuAG and YAG), amorphous glass, nanostructured glass ceramics, and so on.

To protect the detector systems from the high temperatures encountered in boreholes, the detector system may be mounted in a Dewar-type flask. Also, in an exemplary embodiment, source 18 comprises a pulsed neutron source using a D-T reaction wherein deuterium ions are accelerated into a tritium target, thereby generating neutrons having an energy of approximately 14 MeV. The filament current and accelerator voltage are supplied to source 18 through power supply 15. Cable 20 suspends instrument 12 in well 10 and contains the required conductors for electrically connecting instrument 12 with the surface apparatus.

The outputs from LS and SS detectors 14 and 16 are coupled to detector board 22, which amplifies these outputs and compares them to an adjustable discriminator level for passage to channel generator 26. Channel generator 26 converts the output pulse heights to digital values, which are accumulated into pulse height spectra, in which the pulses are sorted according to their amplitudes into a discrete array of bins. The bins uniformly divide the entire amplitude range. These pulse height spectra are accumulated in registers in the spectrum accumulator 28, the spectra being sorted according to their type: inelastic, capture, or background. After a pulse height spectrum has been accumulated, CPU 30 controls the transfer of the accumulated data to the modem 32, which is coupled to cable 20 for transmission of the data over a communication link to the surface apparatus. To be explained later are further functions of CPU 30 in communicating control commands which define certain operational parameters of instrument 12 including the discriminator levels of detector board 22, and the filament current and accelerator voltage supplied to source 18 by power supply 15.

The surface apparatus includes master controller 34 coupled to cable 20 for recovery of data from instrument 12 and for transmitting command signals to instrument 12. There is also associated with the surface apparatus depth controller 36 which provides signals to master controller 34 indicating the movement of instrument 12 within well 10. An input terminal may be coupled to master controller or processor 34 to allow the system operator to provide selected input into master controller 34 for the logging operation to be performed by the system. Display unit 40, and storage unit 44 coupled to the master controller 34 may be provided. The data may also be sent by a link to a remote location. Processing may be done either by the surface processor, at the remote site, or by a downhole processor.

Master controller 34 initially transmits system operation programs and command signals to be implemented by CPU 30, such programs and signals being related to the particular well logging operation. Instrument 12 is then caused to traverse well 10 in a conventional manner, with source 18 being pulsed in response to synchronization signals from channel generator 26. Typically, source 18 is pulsed at a rate of 10,000 bursts/second (10 kHz). This, in turn, causes a burst of high-energy neutrons on the order of 14 MeV to be introduced into the surrounding formation to be investigated. In a manner previously described, this population of high energy neutrons introduced into the formation will cause the generation of gamma rays within the formation which at various times will impinge on LS and SS detectors 14 and 16. As each gamma ray thus impinges upon the crystal-photomultiplier tube arrangement of the detectors, a voltage pulse having an amplitude functionally related to the energy of the particular gamma ray is delivered to detector board 22. Detector board 22 amplifies each pulse and compares them to an adjustable discriminator level, typically set at a value corresponding to approximately 100 keV. If such pulse has an amplitude corresponding to an energy of at least approximately 100 keV, the voltage pulse is transformed into a digital signal and passed to channel generator 26 of MCS section 24.

Figure 1B:
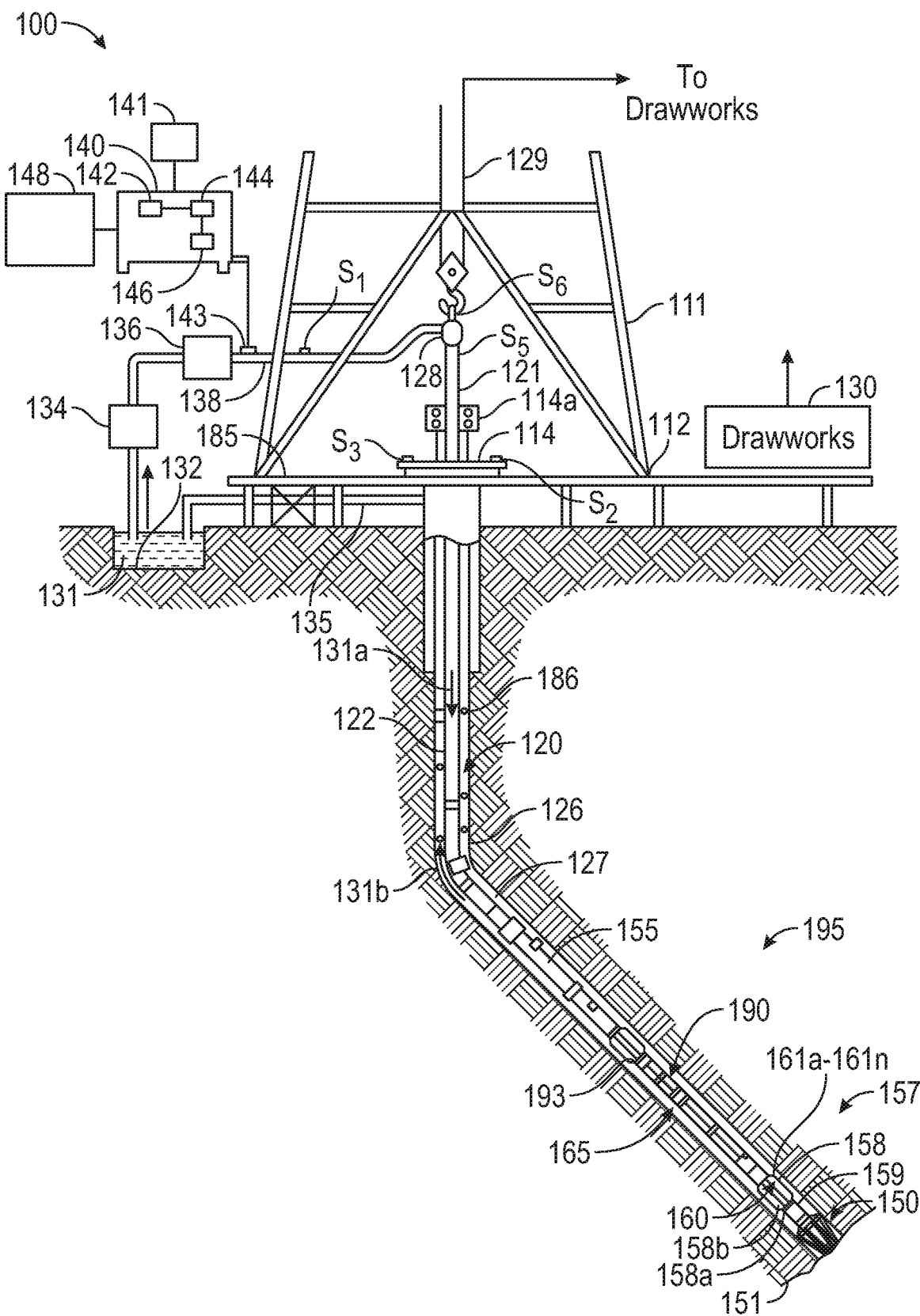
FIG. 1B is a schematic diagram of an example drilling system in accordance with embodiments of the present disclosure.

FIG. 1B is a schematic diagram of an exemplary drilling system 100 that includes a drill string having a drilling assembly attached to its bottom end that includes a steering unit according to one embodiment of the disclosure. FIG. 1B shows a drill string 120 that includes a drilling assembly or bottomhole assembly (BHA) 190 conveyed in a borehole 126. The drilling system 100 includes a conventional derrick 111 erected on a platform or floor 112 which supports a rotary table 114 that is rotated by a prime mover, such as an electric motor (not shown), at a desired rotational speed. A tubing (such as jointed drill pipe 122), having the drilling assembly 190, attached at its bottom end extends from the surface to the bottom 151 of the borehole 126. A drill bit 150, attached to drilling assembly 190, disintegrates the geological formations when it is rotated to drill the borehole 126. The drill string 120 is coupled to a drawworks 130 via a Kelly joint 121, swivel 128 and line 129 through a pulley. Drawworks 130 is operated to control the weight on bit ("WOB"). The drill string 120 may be rotated by a top drive (not shown) instead of by the prime mover and the rotary table 114. Alternatively, a coiled-tubing may be used as the tubing 122. A tubing injector 114a may be used to convey the coiled-tubing having the drilling assembly attached to its bottom end. The operations of the drawworks 130 and the tubing injector 114a are known in the art and are thus not described in detail herein.

A suitable drilling fluid 131 (also referred to as the "mud") from a source 132 thereof, such as a mud pit, is circulated under pressure through the drill string 120 by a mud pump 134. The drilling fluid 131 passes from the mud pump 134 into the drill string 120 via a desurger 136 and the fluid line 138. The drilling fluid 131a from the drilling tubular discharges at the borehole bottom 151 through openings in the drill bit 150. The returning drilling fluid 131b circulates uphole through the annular space 127 between the drill string 120 and the borehole 126 and returns to the mud pit 132 via a return line 135 and drill cutting screen 185 that removes the drill cuttings 186 from the returning drilling fluid 131b. A sensor $S_1$ in line 138 provides information about the fluid flow rate. A surface torque sensor $S_2$ and a sensor $S_3$ associated with the drill string 120 respectively provide information about the torque and the rotational speed of the drill string 120. Tubing injection speed is determined from the sensor $S_5$, while the sensor $S_6$ provides the hook load of the drill string 120.

In some applications, the drill bit 150 is rotated by only rotating the drill pipe 122. However, in many other applications, a downhole motor 155 (mud motor) disposed in the drilling assembly 190 also rotates the drill bit 150. The rate of penetration (ROP) for a given BHA largely depends on the WOB or the thrust force on the drill bit 150 and its rotational speed.

The mud motor 155 is coupled to the drill bit 150 via a drive shaft disposed in a bearing assembly 157. The mud motor 155 rotates the drill bit 150 when the drilling fluid 131 passes through the mud motor 155 under pressure. The bearing assembly 157, in one aspect, supports the radial and axial forces of the drill bit 150, the down-thrust of the mud motor 155 and the reactive upward loading from the applied weight-on-bit.

A surface control unit or controller 140 receives signals from the downhole sensors and devices via a sensor 143 placed in the fluid line 138 and signals from sensors $S_1$-$S_6$ and other sensors used in the system 100 and processes such signals according to programmed instructions provided to the surface control unit 140. The surface control unit 140 displays desired drilling parameters and other information on a display/monitor 141 that is utilized by an operator to control the drilling operations. The surface control unit 140 may be a computer-based unit that may include a processor 142 (such as a microprocessor), a storage device 144, such as a solid-state memory, tape or hard disc, and one or more computer programs 146 in the storage device 144 that are accessible to the processor 142 for executing instructions contained in such programs. The surface control unit 140 may further communicate with a remote control unit 148. The surface control unit 140 may process data relating to the drilling operations, data from the sensors and devices on the surface, data received from downhole, and may control one or more operations of the downhole and surface devices. The data may be transmitted in analog or digital form.

The BHA 190 may also contain formation evaluation sensors or devices (also referred to as measurement-while-drilling ("MWD") or logging-while-drilling ("LWD") sensors) determining resistivity, density, porosity, permeability, acoustic properties, nuclear-magnetic resonance properties, formation pressures, properties or characteristics of the fluids downhole and other desired properties of the formation 195 surrounding the BHA 190. Such sensors are generally known in the art and for convenience are generally denoted herein by numeral 165. The BHA 190 may further include a variety of other sensors and devices 159 for determining one or more properties of the BHA 190 (such as vibration, bending moment, acceleration, oscillations, whirl, stick-slip, etc.) and drilling operating parameters, such as weight-on-bit, fluid flow rate, pressure, temperature, rate of penetration, azimuth, tool face, drill bit rotation, etc.) For convenience, all such sensors are denoted by numeral 159.

The BHA 190 may include a steering apparatus or tool 158 for steering the drill bit 150 along a desired drilling path. In one aspect, the steering apparatus may include a steering unit 160, having a number of force application members 161a-161n, wherein the steering unit is at partially integrated into the drilling motor. In another embodiment the steering apparatus may include a steering unit 158 having a bent sub and a first steering device 158a to orient the bent sub in the wellbore and the second steering device 158b to maintain the bent sub along a selected drilling direction.

The drilling system 100 may include sensors, circuitry and processing software and algorithms for providing information about desired dynamic drilling parameters relating to the BHA, drill string, the drill bit and downhole equipment such as a drilling motor, steering unit, thrusters, etc. Exemplary sensors include, but are not limited to drill bit sensors, an RPM sensor, a weight on bit sensor, sensors for measuring mud motor parameters (e.g., mud motor stator temperature, differential pressure across a mud motor, and fluid flow rate through a mud motor), and sensors for measuring acceleration, vibration, whirl, radial displacement, stick-slip, torque, shock, vibration, strain, stress, bending moment, bit bounce, axial thrust, friction, backward rotation, BHA buckling, and radial thrust. Sensors distributed along the drill string can measure physical quantities such as drill string acceleration and strain, internal pressures in the drill string bore, external pressure in the annulus, vibration, temperature, electrical and magnetic field intensities inside the drill string, bore of the drill string, etc. Suitable systems for making dynamic downhole measurements include COPILOT, a downhole measurement system, manufactured by BAKER HUGHES INCORPORATED.

The drilling system 100 can include one or more downhole processors at a suitable location such as 193 on the BHA 190. The processor(s) can be a microprocessor that uses a computer program implemented on a suitable non-transitory computer-readable medium that enables the processor to perform the control and processing. The non-transitory computer-readable medium may include one or more ROMs, EPROMs, EAROMs, EEPROMs, Flash Memories, RAMs, Hard Drives and/or Optical disks. Other equipment such as power and data buses, power supplies, and the like will be apparent to one skilled in the art. In one embodiment, the MWD system utilizes mud pulse telemetry to communicate data from a downhole location to the surface while drilling operations take place. The surface processor 142 can process the surface measured data, along with the data transmitted from the downhole processor, to evaluate formation lithology. While a drill string 120 is shown as a conveyance system for sensors 165, it should be understood that embodiments of the present disclosure may be used in connection with tools conveyed via rigid (e.g. jointed tubular or coiled tubing) as well as non-rigid (e. g. wireline, slickline, e-line, etc.) conveyance systems. The drilling system 100 may include a bottomhole assembly and/or sensors and equipment for implementation of embodiments of the present disclosure on either a drill string or a wireline. A point of novelty of the system illustrated in FIG. 1 is that the surface processor 142 and/or the downhole processor 193 are configured to perform certain methods (discussed below) that are not in prior art.

Figure 2:
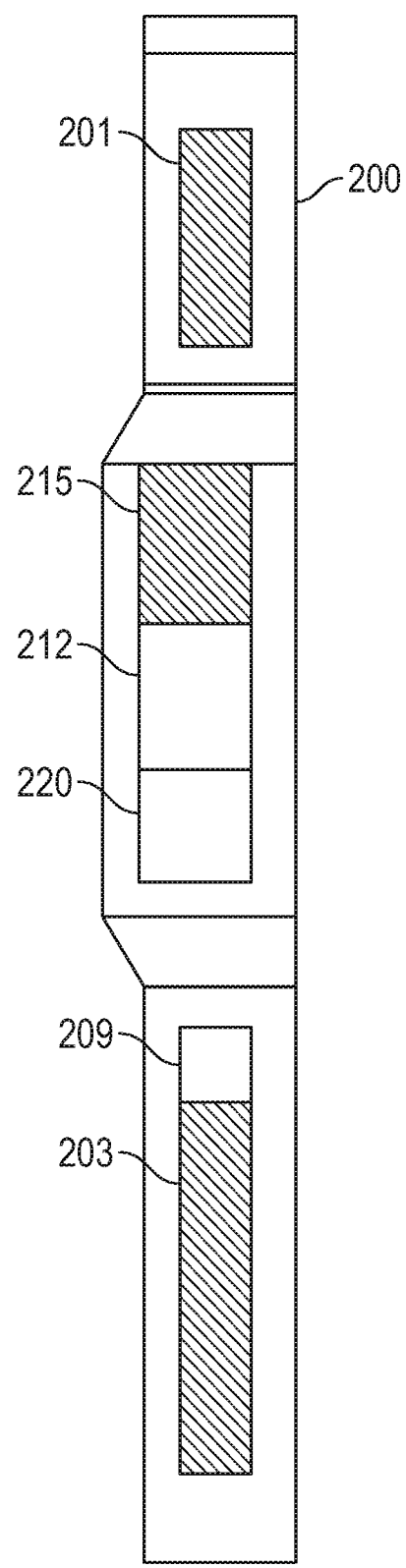
FIG. 2 illustrates a schematic diagram of an instrument suitable for use with the present invention.

FIG. 2 illustrates a schematic diagram of an instrument suitable for use with the present invention. The Formation Lithology Explorer™ ('FLEX') is a wireline instrument designed to provide formation mineralogical information, shale identification, and clay typing. The enhanced mineralogical data obtained from the FLEX also enables enhanced porosity measurements. The present invention is usable in open-hole wireline logging systems. In a typical embodiment, the present invention uses the ECLIPS™ acquisition system of Baker Hughes Incorporated. Alternatively, the present invention can be used, for example, with the FOCUS system of Baker Hughes, Incorporated. Often the FLEX™ is run in combination with Gamma Ray/Spectralog, Neutron, and Density nuclear tools in addition to tools such as resistivity, acoustics, NMR and others.

The FLEX™ measurement device of FIG. 2 employs the principle of neutron-induced gamma ray spectroscopy. FLEX™ component parts may be encapsulated within wireline device casing 200. The neutron source of the present invention is typically a pulsed neutron source. The use of a pulsed neutron source is advantageous over the use of a chemical neutron source due to its ability to generate inelastic gamma rays over a wider range of energies. It also allows a spectrum of capture gamma rays to be generated which is free from inelastic gamma ray contamination, which can also be corrected for background activation gamma rays. Neutron source 209 discharges high-energy bursts of neutrons into the surrounding formation. The electronic pulsed neutron generator is typically operated at a rate of approximately 10,000 Hz, so that each burst takes place within a 100 microsecond window. Gamma rays produced via interaction of the discharged neutrons and the formation are detected at the scintillation detector 212 attached to acquisition and telemetry electronics 215. Power supply 201 enables the FLEX device. Electronics 203 enables the neutron source. A shield 220 attenuates the neutron flux propagating directly from the source to the detector as well as attenuating gamma rays generated within the shield.

Figure 3:
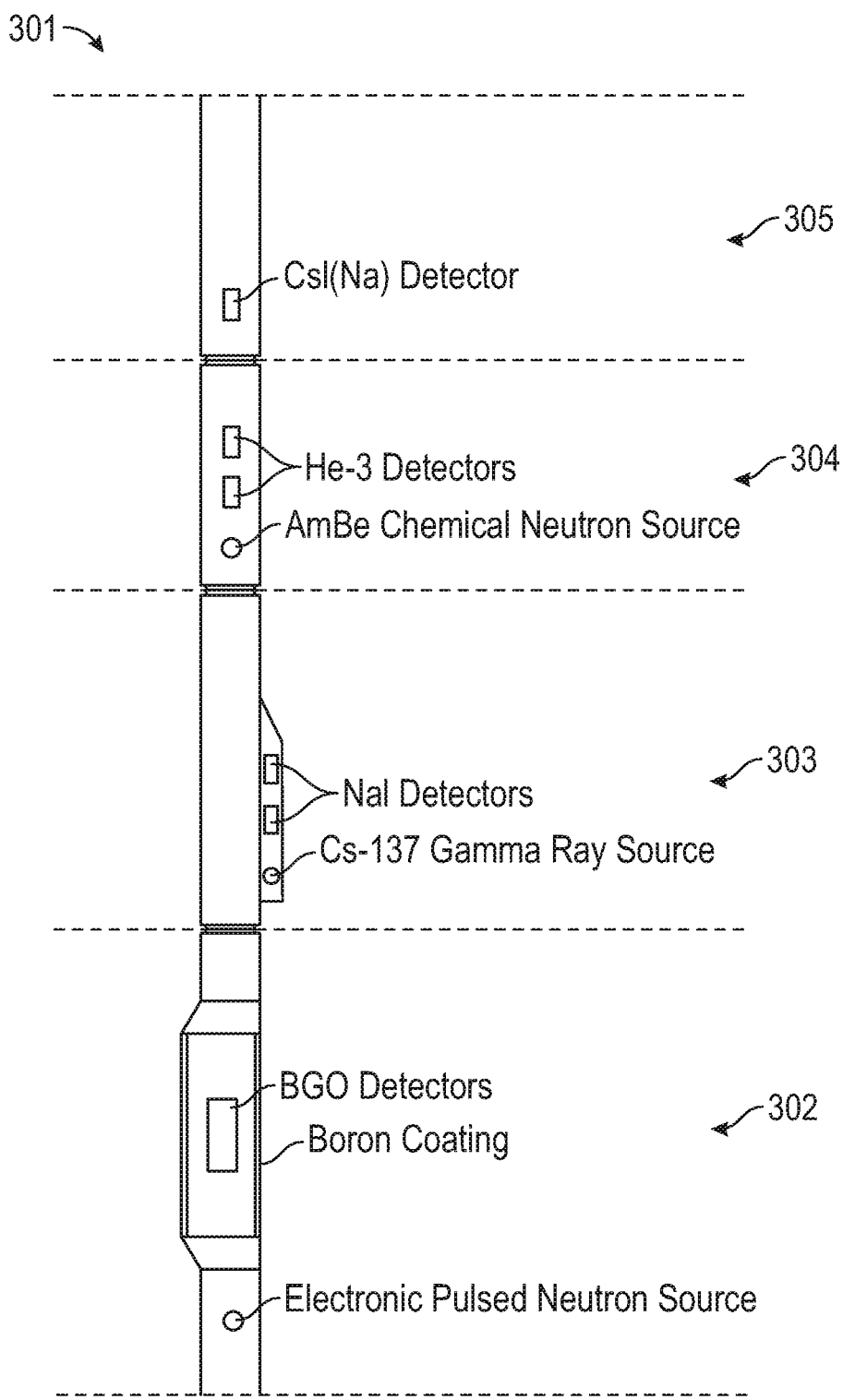
FIG. 3 illustrates exemplary components of a logging string of the present disclosure.

FIG. 3 illustrates exemplary components of a logging string of the present disclosure. The instruments on the logging string 301 may include: a pulsed neutron tool 302 of the kind described above; a density tool 303, a natural gamma ray tool 305; and a neutron porosity tool 304. The natural gamma ray tool 305 provides data that is processed to give elemental information on Potassium (K), Thorium (Th) and Uranium (U). The pulsed neutron measurements may be analyzed to give an elemental analysis of other elements using the method discussed in U.S. Pat. No. 7,205,535 to Madigan et al., having the same assignee as the present disclosure and the contents of which are incorporated herein by reference, wherein an elemental analysis of the pulsed neutron measurements is carried out. The ensemble of tools used may be referred to as a downhole assembly.

While a wireline is shown as a conveyance system for the nuclear detection module, it should be understood that embodiments of the present disclosure may be used in connection with tools conveyed via rigid (e.g. jointed tubular or coiled tubing) as well as non-rigid (e. g. wireline, slickline, e-line, etc.) conveyance systems.

Gamma Ray Spectra Contrast Sharpening

Aspects of the present disclosure relate to mitigating spectral distortion in a response spectra resulting from degraded performance of the radiation detector. The spectral distortion may be caused by at least one of: i) environmental conditions in the formation, and ii) deterioration of at least one component of the radiation detector. The spectral distortion may comprise a difference between the response spectrum and a true, non-distorted, spectrum accurately reflecting the nuclear phenomena.

Aspects include recovering an enhanced response spectrum estimating the true spectrum, comprising mitigating the spectral distortion by applying at least one contrast sharpening mask to the response spectrum. The at least one contrast sharpening mask may comprise at least a low pass smoothing mask subtracted from a unity mask which when applied to the response spectrum obtains high-frequency data and adds the high-frequency data to the response spectrum. The response spectrum may be a gamma ray spectrum. The response spectrum may be indicative of gamma ray interactions including at least one of i) Compton scattering, ii) photoelectric effect, and iii) pair production.

The true spectrum may include at least one feature absent from the response spectrum. Mitigating the spectral distortion may include restoring the at least one feature to the enhanced response spectrum. The at least one feature may include a response curve peak at a characteristic energy associated with a reference sample. In the field of spectral gamma ray logging, it would be desirable to reverse the effects on the acquired data to restore the obtained spectra to a substantially non-distorted condition before any processing is done to ensure accurate spectral decompositions.

Figure 4A:
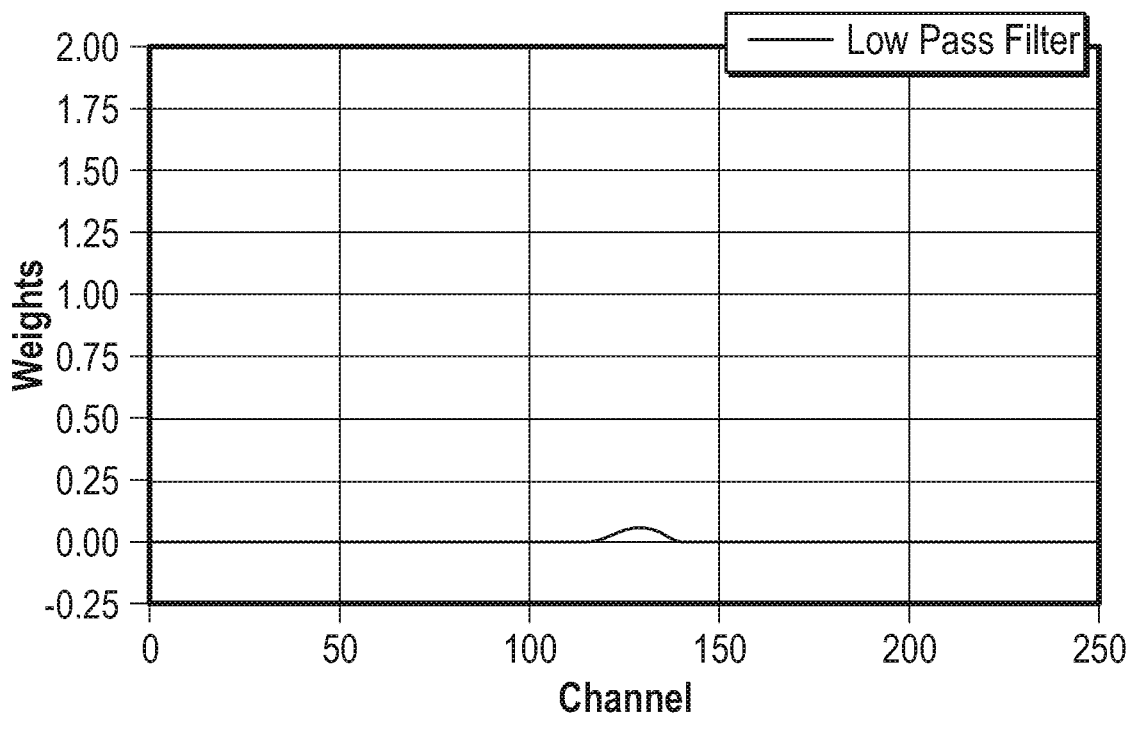
FIGS. 4A-4C illustrate mask used in accordance with embodiments of the present disclosure.
Figure 4B:
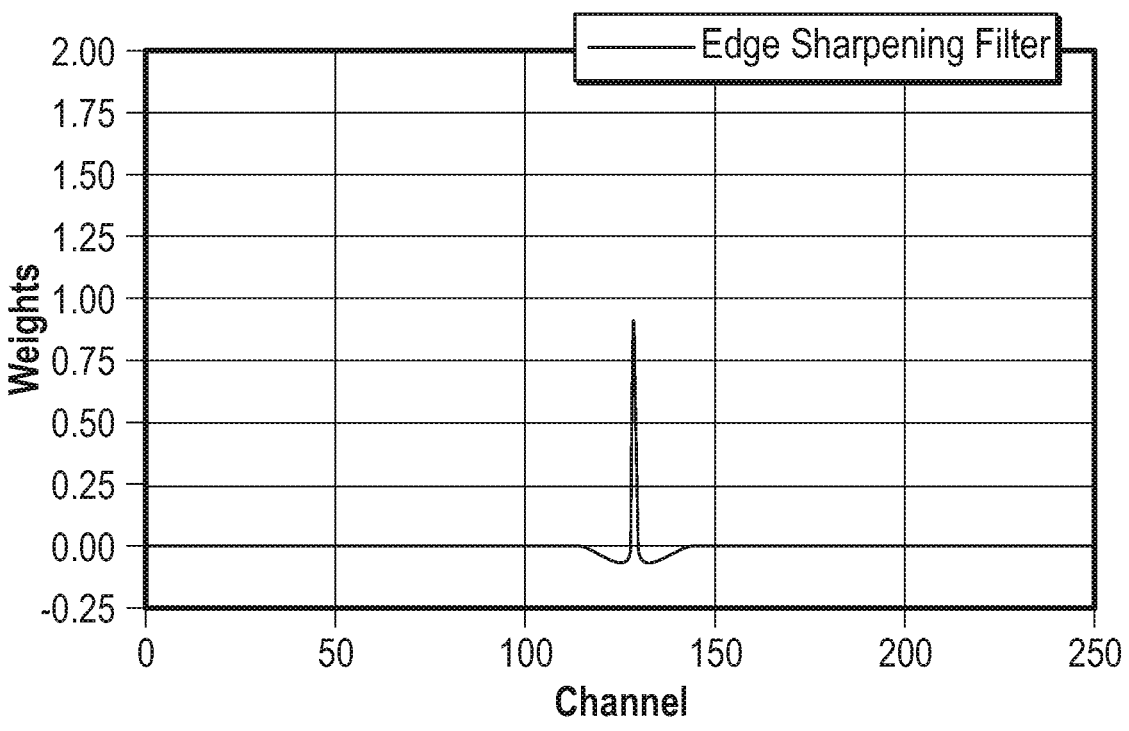
Figure 4C:
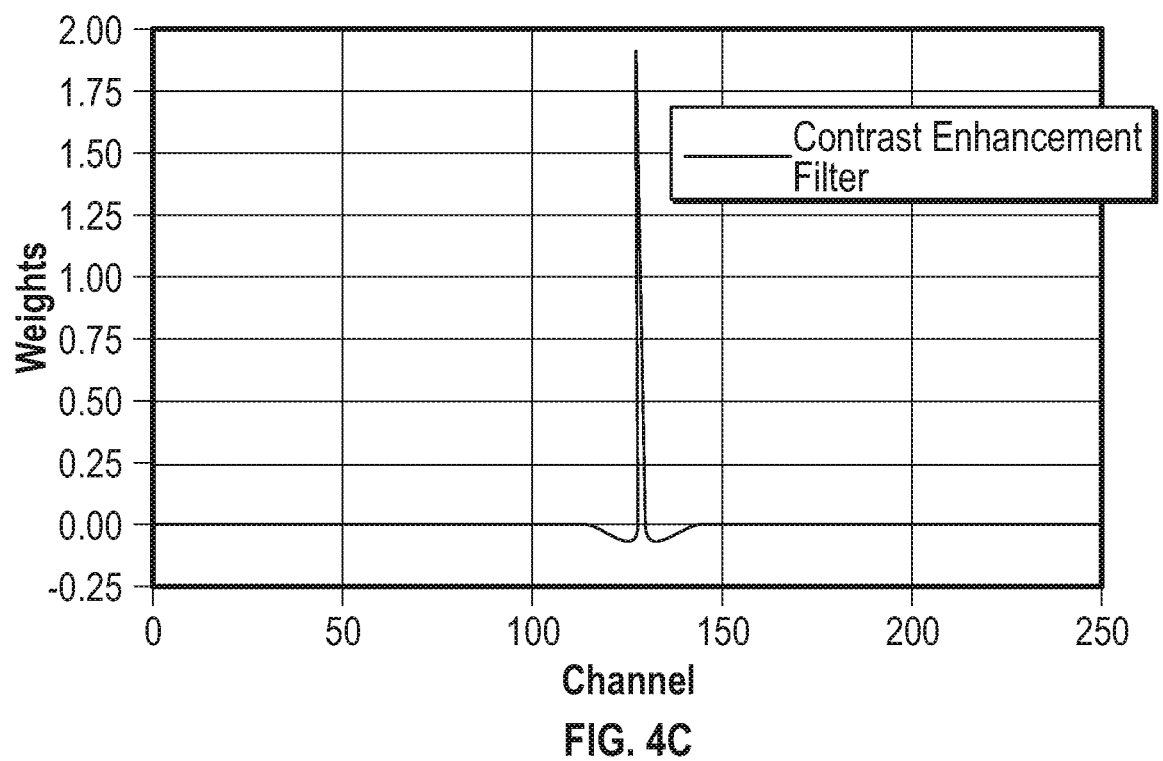

FIGS. 4A-4C illustrate masks used in accordance with embodiments of the present disclosure. Aspects of the present disclosure employ image processing mask techniques, and particularly schemes for contrast correction. One goal of the present disclosure is to enhance the contrast of the one dimensional array. Image contrast enhancement is carried out by first applying a low pass smoothing mask. The data created by this mask may be considered the low frequency component of the spectrum. FIG. 4A illustrates an example low pass smoothing mask in accordance with embodiments of the present disclosure.

In the second step, a new mask is created by subtracting the low pass smoothing mask from the unity mask. FIG. 4B illustrates an edge enhancement mask of the second step in accordance with embodiments of the present disclosure. The data convolved by this mask shows the high frequency component of the spectrum. In the last step, the high frequency data is added to the original spectrum, by adding the edge enhancement mask in the second step to the original spectrum. FIG. 4C illustrates the contrast sharpening mask in accordance with embodiments of the present disclosure. The mask in FIG. 4C provides a contrast enhanced spectrum.

Filter characteristics may be chosen according to system parameters in accordance with the particular application. For example, the parameter of standard derivation will determine the shape of a Gaussian based filter. However, when performing convolution with Gaussian filtering, another parameter, the window size of Gaussian filter, should also be determined at the same time. The size of the mask drives the filter amount. A larger size, corresponding to a larger convolution mask, may generally result in a greater degree of filtering. Filter mask size may depend on the scintillator resolution, which may be expressed as, for example, full width at half maximum ('FWHM'). FWHM may also vary in accordance with energy level. Thus, selection of a filter with particular characteristics (e.g., size) may be carried out in dependence upon resolution or energy level.

Figure 5A:
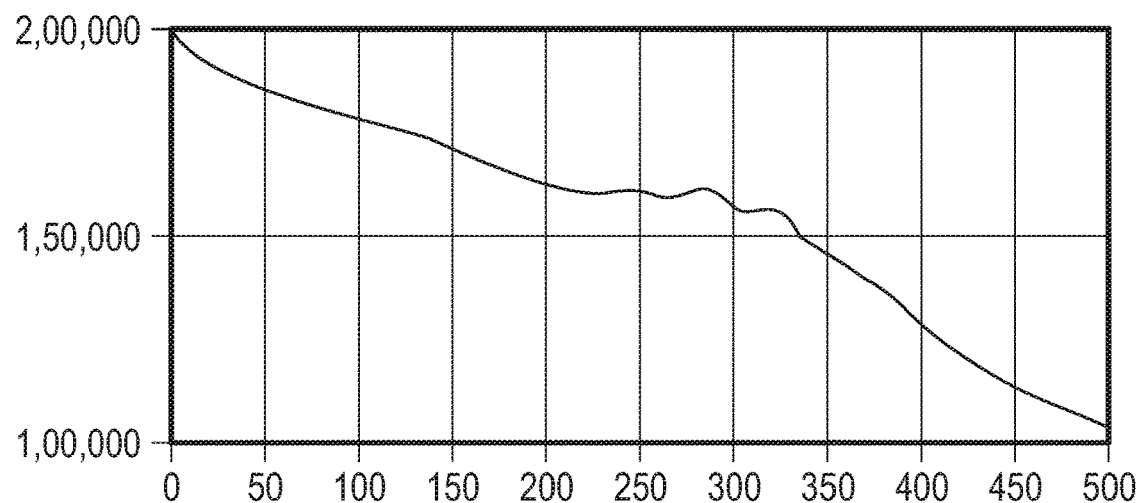
FIGS. 5A-5D illustrate the results of a data set processed with the masks of FIGS. 4A-4C, respectively.
Figure 5B:
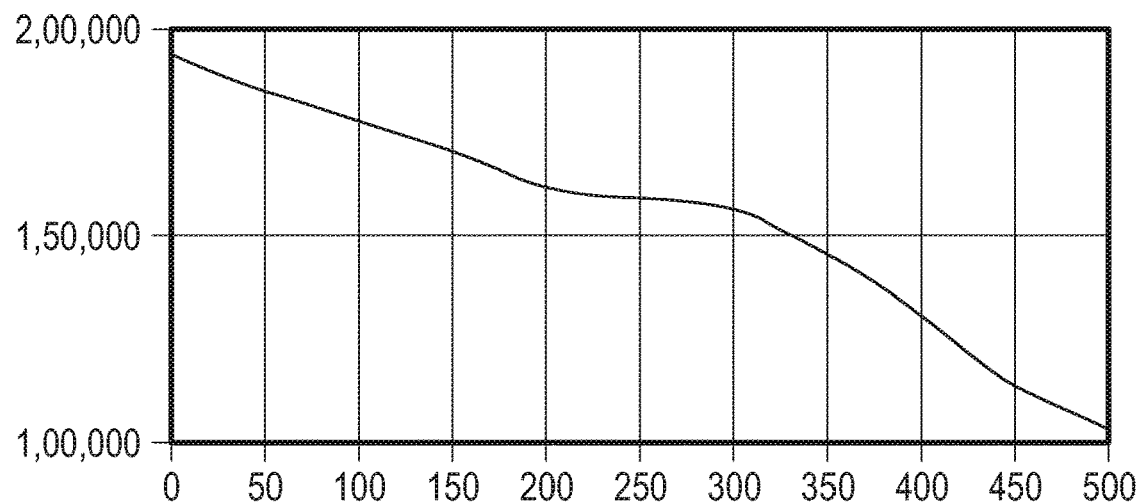
Figure 5C:
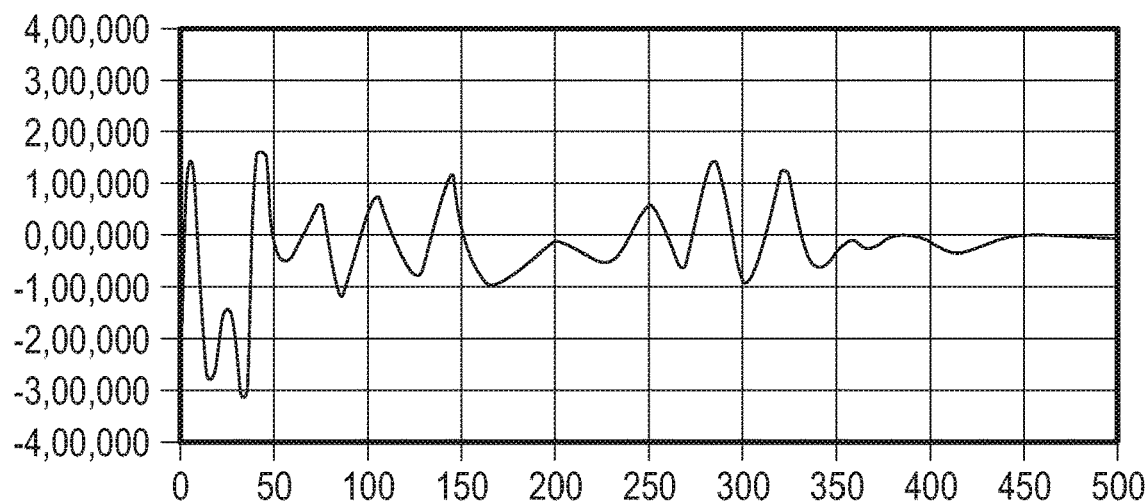
Figure 5D:
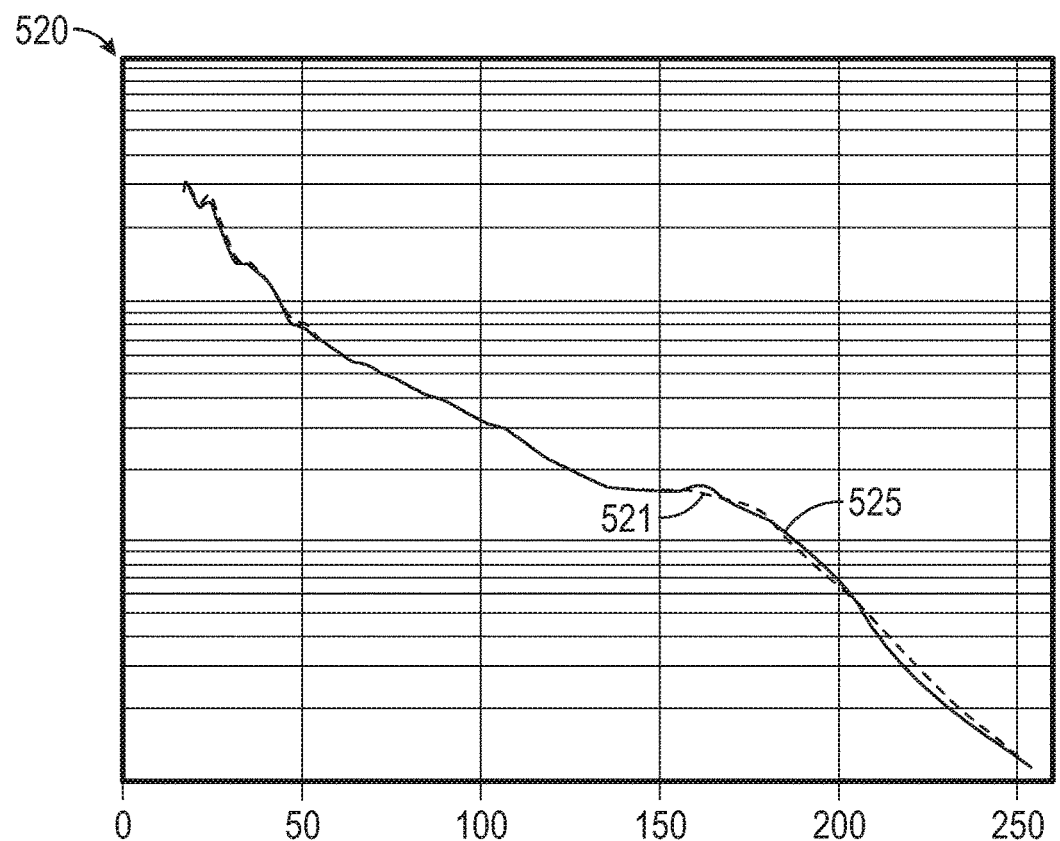

FIGS. 5A-5D illustrate the results of a data set processed with the masks of FIGS. 4A-4C, respectively. FIG. 5A shows the results of the original raw response spectrum. FIG. 5B shows the results of the response spectrum after application of a low pass smoothing mask. FIG. 5C shows the results of the response spectrum after application of the edge enhancement mask. FIG. 5D shows the enhancement of the enhanced response spectrum when compared to the original response spectrum. The raw and contrast enhanced curves separate from each other around the peaks with the enhanced peaks having more defined shapes compared to the original raw spectrum. Thus, with the mask in FIG. 5D, it is possible to recover some of the spectral features that were lost due to the distortions induced by the detector degradation and/or environmental effects. These results are not limited to elemental analysis, but instead may be employed with any application utilizing gamma spectra.

Techniques described herein may be used in a wide variety of radiation based measurements, and for many different applications. As one example, carbon and oxygen are of particular interest in oil well logging. Carbon and oxygen ('C/O') logging is a widely applied type of pulsed neutron logging for oil and water saturation in the formation. In the C/O mode, relative amounts of carbon & oxygen in the formation are identified to generate a C/O ratio. As is apparent, the C/O ratio would be higher in hydrocarbon bearing formations than in water bearing formations, holding other factors (e.g., porosity, lithology, etc) the same. C/O logging uses scintillation detectors to identify the gamma rays from carbon and oxygen, which are produced from a neutron inelastic scattering interaction. In practice, the most important gamma rays emitted from these elements may be at 4.44 MeV for carbon and 6.13 MeV for oxygen. The following table shows the typical inelastic gamma rays and the energy windows used for carbon and oxygen:

TABLE 1

| Nucleus | Energy (MeV) | Window (MeV) |
| --- | --- | --- |
| Carbon | 4.44 | 3.21-4.75 |
| Oxygen | 6.13, 7.1 | 4.79-7.05 |

Figure 6:
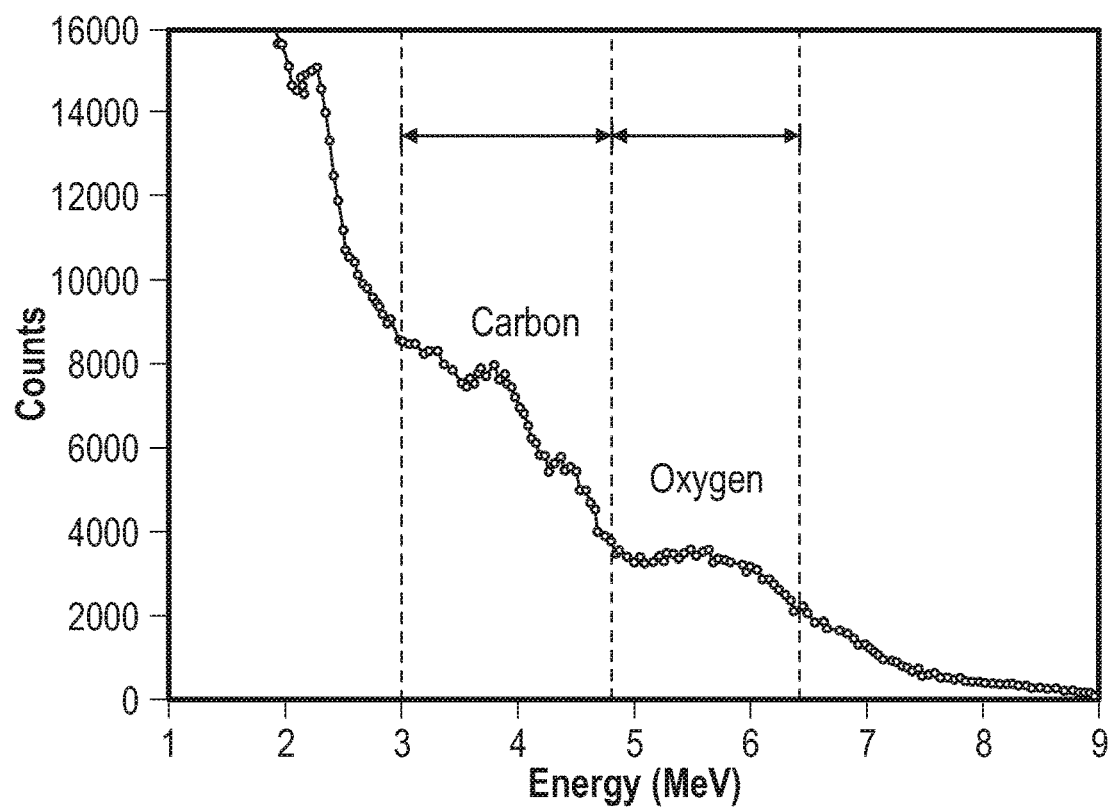
FIG. 6 illustrates an example C/O spectrum.

The ratio of the gamma-ray counts in the carbon window to those in the oxygen window (C/O ratio) is proportional to the ratio of the number of carbon nuclei to the number of oxygen nuclei in the medium surrounding the tool, which, with proper interpretation, can be used to estimate the formation oil saturation and determine the amount of residual oil. FIG. 2 illustrates a schematic diagram of an instrument suitable for use with the present invention. FIG. 3 illustrates exemplary components of a logging string of the present disclosure. FIGS. 4A-4C illustrate mask used in accordance with embodiments of the present disclosure. FIGS. 5A-5D illustrate the results of a data set processed with the masks of FIGS. 4A-4C, respectively. An example of C/O spectrum is shown in FIG. 6.

Figure 7A:
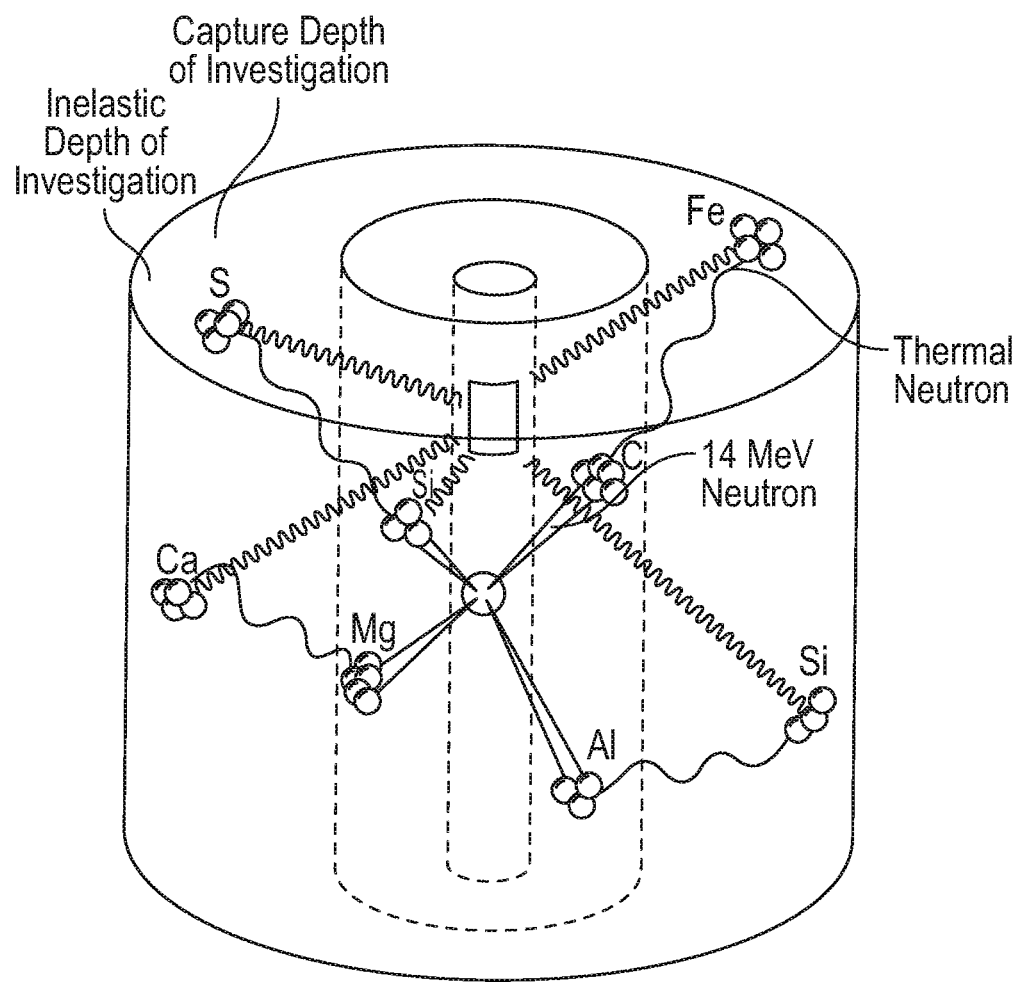
FIG. 7A illustrates neutron interaction.
Figure 7B:
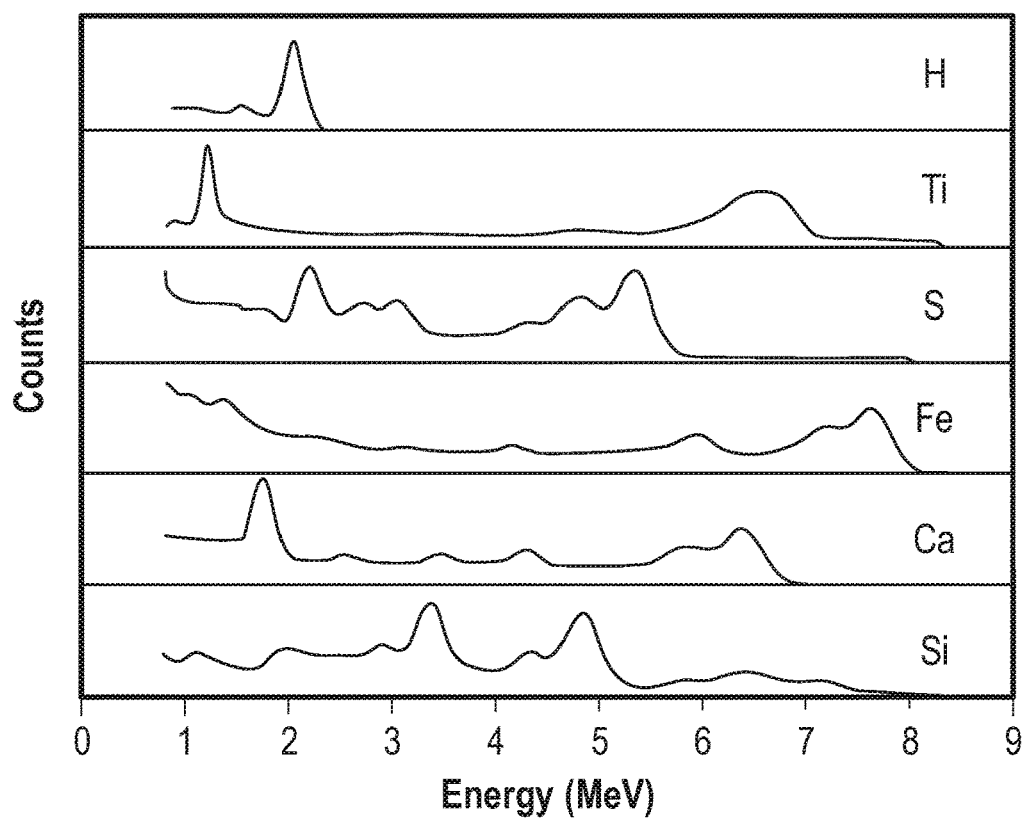
FIG. 7B illustrates an example capture elemental standard in accordance with embodiments of the present disclosure.
Figure 7C:
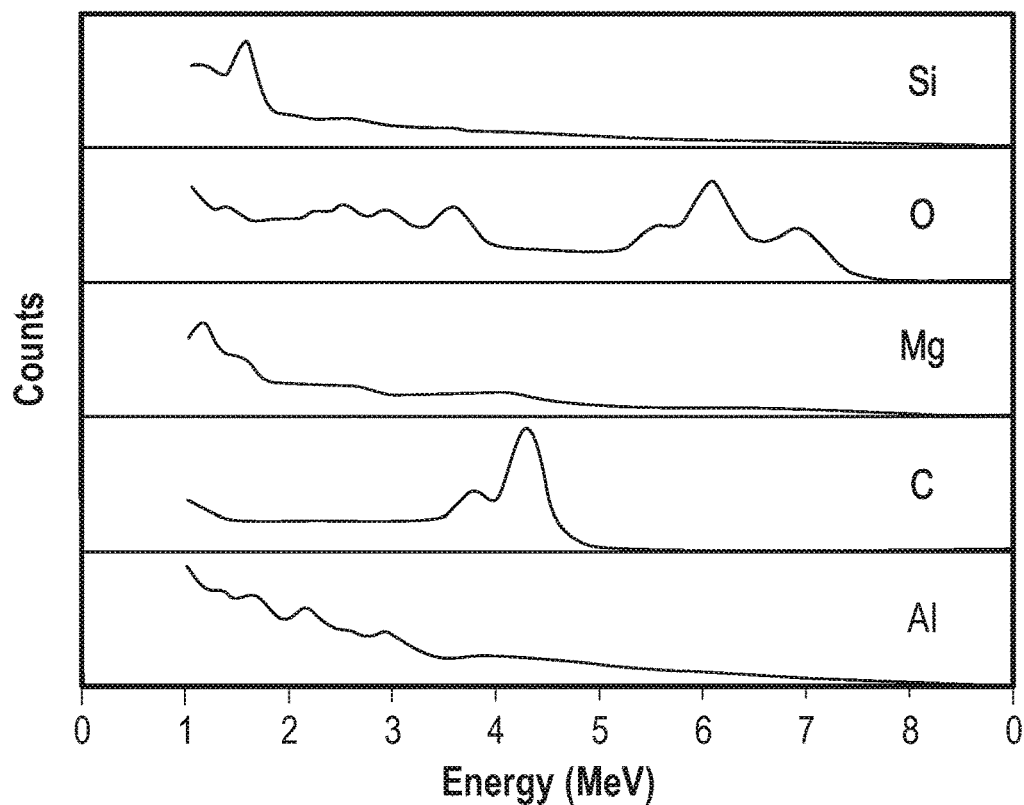
FIG. 7C illustrates an example inelastic elemental standard in accordance with embodiments of the present disclosure.

Full-spectrum fitting in pulsed neutron logging can provide lithological and quantitative mineralogical information for accurate formation evaluation. As described above, the logging system utilizes an electronic pulses source to send high energy neutrons into the surrounding formation. These neutrons quickly lose energy as a result of scattering, after which they are absorbed by the various atoms within the ambient environment. The scattered as well as the absorbed neutrons cause the atoms of the various elements to emit gamma rays with characteristic energies, resulting in both inelastic and capture gamma ray energy spectra. The associated neutron interaction is shown in FIG. 7A. The capture and inelastic elemental standards are shown in FIG. 7B and FIG. 7C.

Elemental standards-based spectral decomposition may use a combination of reference spectra, with each reference spectrum multiplied by a respective weighting coefficient. Typically a reference spectrum is included for each element of interest (e.g., an element the concentration of which is desired to be known), or for each element producing significant radiation. Each reference spectrum represents a response curve corresponding to radiation attributable to a particular sample element (e.g., uranium). Deconvolution may be linear or non-linear, and may be carried out on the response spectrum holistically without energy windows (i.e., "windowlessly"). These coefficients may be used to determine the portion of the matter of the volume constituted by the sample element. The response spectrum may be measured over a wide range of energies, resulting in improved estimation of the parameter of interest. For example, the response spectrum may span a continuous energy range including gamma ray photo peaks at characteristic energies associated with respective elements for all of the sample elements. The energy range may fall between 100 keV and 10 MeV, such that the lowest energy in the range is higher than 100 keV and the highest energy in the range is lower than 10 MeV.

The standard spectra may be derived from analysis of the samples in a laboratory or on-site, or may be modeled standards—that is, standards derived using a variety of numerical, simulated, statistical, or other software-based techniques (e.g., Monte Carlo techniques), which may be obtained using a variety of methods. In one example, gamma ray measurement of a sample may provide a response spectrum to be used as the reference spectrum ('standard') for that element. Variations in patterns may be used for analysis of "shapes" and "peaks" to attribute gamma ray counts to a specific radiation responsive component (e.g., the first radiation responsive component, the second radiation responsive component, etc.).

Figure 8:
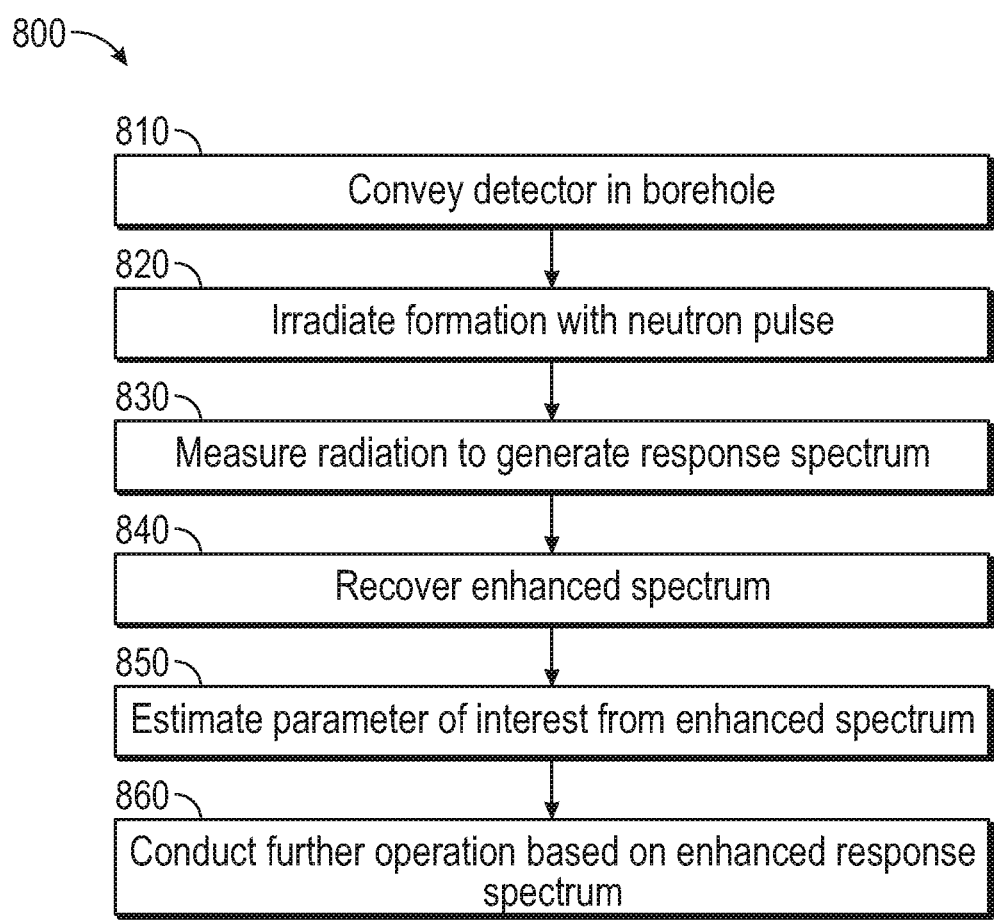
FIG. 8 illustrates methods in accordance with embodiments of the present disclosure.

FIG. 8 illustrates methods in accordance with embodiments of the present disclosure. Optional step 810 of method 800 comprises conveying a radiation detector downhole using a carrier. Step 820 comprises irradiating the earth formation with a neutron pulse produced by a pulsed neutron source disposed in the borehole to produce gamma-rays. Step 830 comprises measuring radiation responsive to the irradiation to generate a response spectrum.

Step 840 comprises recovering an enhanced response spectrum estimating the true spectrum. Step 840 may include mitigating the spectral distortion by applying at least one contrast sharpening mask to the response spectrum. The at least one contrast sharpening mask may comprise at least a low pass smoothing mask subtracted from a unity mask which when applied to the response spectrum obtains high-frequency data and adds the high-frequency data to the response spectrum. Mitigating the spectral distortion may include restoring the at least one feature to the enhanced response spectrum. The at least one feature may include a response curve peak at a characteristic energy associated with a reference sample. The contrast enhancement mask may be configured for anticipated possible features, such as, for example, characteristic peaks at an energy corresponding to candidate elements anticipated to be the formation.

Step 850 comprises estimating a parameter of interest from the enhanced response spectrum. Step 850 may include deconvolving the enhanced response spectrum. Deconvolving the enhanced response spectrum may be carried out by determining a best fit to the enhanced response spectrum using a combination of standard spectra. Deconvolving the enhanced response spectrum may include using one of i) a linear; and ii) a non-linear weighted least squared error minimization technique.

Optional step 860 comprises conducting further operations in the formation in dependence upon the enhanced response spectrum, directly or indirectly (e.g., based on a parameter of interest estimated from the enhanced response spectrum). The further operations may comprise at least one of: i) geosteering; ii) drilling at least one borehole in the formation; iii) performing measurements on the formation; iv) estimating at least one parameter of interest of the formation; v) installing equipment in a borehole in the formation; vi) evaluating the formation; vii) optimizing development in the formation; viii) optimizing development in a formation related to the formation; ix) optimizing exploration in the formation; x) optimizing exploration in a formation related to the formation; xi) producing at least one hydrocarbon from the formation.

In some embodiments, estimation of the parameter of interest may involve applying a model. The model may include, but is not limited to, (i) a mathematical equation, (ii) an algorithm, (iii) an energy spectrum deconvolution technique, (iv) an energy spectrum stripping technique, (v) an energy spectrum window technique, (vi) a time spectrum deconvolution technique, (vii) a time spectrum window technique, or a combination thereof.

Returning to FIG. 1A, certain embodiments of the present disclosure may be implemented with a hardware environment 80 that includes an information processor 81, a information storage medium 83, an input device 85, processor memory 87, and may include peripheral information storage medium 89. The hardware environment 80 may be in the well, at the rig, or at a remote location. Moreover, the several components of the hardware environment may be distributed among those locations. The input device 85 may be any information reader or user input device, such as data card reader, keyboard, USB port, etc. The information storage medium 83 stores information provided by the detectors. Information storage medium 83 may be any standard computer information storage device, such as a ROM, USB drive, memory stick, hard disk, removable RAM, EPROMs, EAROMs, EEPROM, flash memories, and optical disks or other commonly used memory storage system known to one of ordinary skill in the art including Internet based storage. Information storage medium 83 stores a program that when executed causes information processor 81 to execute the disclosed method. Information storage medium 83 may also store the formation information provided by the user, or the formation information may be stored in a peripheral information storage medium 89, which may be any standard computer information storage device, such as a USB drive, memory stick, hard disk, removable RAM, or other commonly used memory storage system known to one of ordinary skill in the art including Internet based storage. Information processor 81 may be any form of computer or mathematical processing hardware, including Internet based hardware. When the program is loaded from information storage medium 83 into processor memory 87 (e.g. computer RAM), the program, when executed, causes information processor 81 to retrieve detector information from either information storage medium 83 or peripheral information storage medium 89 and process the information to estimate a parameter of interest. Information processor 81 may be located on the surface or downhole.

Estimated parameter values and/or models of the formation (or portions thereof) may be stored (recorded) as information or visually depicted on a display. The visual depiction may include a two-dimensional (2D) or three dimensional (3D) graphical depiction of parameter values (although one-dimensional (1D) depictions may also be displayed in some applications). The parameter values or model may be transmitted before or after storage or display, such as, for example, being transmitted uphole (i.e., to the surface or to modules closer to the surface). For example, information may be transmitted to other downhole components, or to the surface for storage, display, or further processing. Aspects of the present disclosure relate to modeling a volume of an earth formation using the estimated parameter values, such as, for example, by associating estimated parameter values with portions of the volume of interest to which they correspond, or by representing a boundary between areas of representative or statistically similar values along with the formation in a global coordinate system. Aspects include maintaining a model comprising a representation of the earth formation stored as information including a representation of parameter values with respect to location, either as absolute values or variances thereof. The model of the earth formation generated and maintained in aspects of the disclosure may be implemented as a representation of the earth formation stored as information, including a graphic representation of parameter values or variances in elemental concentrations, C/O ratio, water saturation, or other parameters of interest with respect to location, e.g., in 1D, 2D, or 3D. In one example, a model of the earth formation may be maintained in a database. Modeling the earth formation may comprise associating a portion of the formation proximate the borehole with the parameter as estimated herein, to generate or update the model. The information (e.g., data) may also be transmitted, stored on a non-transitory machine-readable medium, and/or rendered (e.g., visually depicted) on a display. Any of rendering the models, the values, or information representing the same may be referred to herein as "displaying the estimated parameter on a display."

The processing of the measurements by a processor may occur at the tool, the surface, or at a remote location. The data acquisition may be controlled at least in part by the electronics. Implicit in the control and processing of the data is the use of a computer program on a suitable non-transitory machine readable medium that enables the processors to perform the control and processing. The non-transitory machine readable medium may include ROMs, EPROMs, EEPROMs, flash memories and optical disks. The term processor is intended to include devices such as a field programmable gate array (FPGA).

The term "processor" or "information processing device" herein includes, but is not limited to, any device that transmits, receives, manipulates, converts, calculates, modulates, transposes, carries, stores or otherwise utilizes information. An information processing device may include a microprocessor, resident memory, and peripherals for executing programmed instructions. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on. Thus, a processor may be configured to perform one or more methods as described herein, and configuration of the processor may include operative connection with resident memory and peripherals for executing programmed instructions.

In some embodiments, estimation of the parameter of interest (e.g., C/O ratio, water saturation, etc.) may involve applying a model, as described herein above. The model may include, but is not limited to, (i) a mathematical equation, (ii) an algorithm, (iii) a database of associated parameters, (iv) a rule set, (v) a heuristic, (vi) a function, and (vii) other relational techniques, or a combination thereof.

Control of components of apparatus and systems described herein may be carried out using one or more models as described above. For example, at least one processor may be configured to modify operations i) autonomously upon triggering conditions, ii) in response to operator commands, or iii) combinations of these. Such modifications may include changing drilling parameters, steering the drillbit (e.g., geosteering), changing a mud program, optimizing measurements, and so on. Control of these devices, and of the various processes of the system generally, may be carried out in a completely automated fashion or through interaction with personnel via notifications, graphical representations, user interfaces and the like. Reference information accessible to the processor may also be used.

Formation lithology may include formation mineral type, porosity, and fluid in the pore space. Mineralogy may include the chemical composition and structure of minerals in the formation. Herein, "information" may include raw data, processed data, analog signals, and digital signals. The term "conveyance device" or "carrier" as used above means any device, device component, combination of devices, media and/or member that may be used to convey, house, support or otherwise facilitate the use of another device, device component, combination of devices, media and/or member. Exemplary non-limiting conveyance devices (carriers) include drill strings of the coiled tube type, of the jointed pipe type and any combination or portion thereof. Other conveyance device examples include casing pipes, wirelines, wire line sondes, slickline sondes, drop shots, downhole subs, BHA's, drill string inserts, modules, internal housings and substrate portions thereof, self-propelled tractors. As used above, the term "sub" refers to any structure that is configured to partially enclose, completely enclose, house, or support a device. The term "mask" used herein refers to filter-based data enhancement. The term "information" as used above includes any form of information (Analog, digital, EM, printed, etc.). The term "information processing device" herein includes, but is not limited to, any device that transmits, receives, manipulates, converts, calculates, modulates, transposes, carries, stores or otherwise utilizes information. An information processing device may include a microprocessor, resident memory, and peripherals for executing programmed instructions.

While the foregoing disclosure is directed to the one mode embodiments of the disclosure, various modifications will be apparent to those skilled in the art. It is intended that all variations be embraced by the foregoing disclosure.

What is claimed is:

1. A method for estimating at least one parameter of interest of a volume in an earth formation from a response spectrum representing radiation information obtained by a radiation detector in a borehole intersecting the volume responsive to nuclear phenomena in the volume, wherein the response spectrum includes spectral distortion resulting from degraded performance of the radiation detector, the spectral distortion comprising a difference between the response spectrum and a true spectrum accurately reflecting the nuclear phenomena, the method comprising:
recovering an enhanced response spectrum estimating the true spectrum, comprising mitigating the spectral distortion by applying at least one contrast sharpening mask to the response spectrum.

2. The method of claim 1, wherein the response spectrum is a gamma ray energy spectrum.

3. The method of claim 1, wherein the response spectrum is indicative of gamma ray interactions including at least one of i) Compton scattering, ii) photoelectric effect, and iii) pair production.

4. The method of claim 1, wherein the true spectrum comprises at least one feature absent from the response spectrum, and wherein mitigating the spectral distortion comprises restoring the at least one feature to the enhanced response spectrum.

5. The method of claim 4, wherein the at least one feature comprises a response curve peak at a characteristic energy associated with a reference sample.

6. The method of claim 1, wherein the spectral distortion is caused by at least one of: i) environmental conditions in the formation, and ii) deterioration of at least one component of the radiation detector.

7. The method of claim 1, wherein the parameter of interest comprises at least one of: i) the concentration of at least one chemical element in the volume; ii) a carbon-oxygen ratio of the volume; iii) spectral calibration.

8. The method of claim 1, wherein the parameter of interest is a physical characteristic of the analysis volume.

9. The method of claim 1, comprising deconvolving the enhanced response spectrum.

10. The method of claim 9, wherein deconvolving the enhanced response spectrum further comprises determining a best fit to the enhanced response spectrum using a combination standard spectra.

11. The method of claim 9, wherein deconvolving the enhanced response spectrum further comprises using one of i) a linear; and ii) a non-linear weighted least squared error minimization technique.

12. The method of claim 1, wherein the response spectrum spans a continuous energy range between 100 keV and 10 MeV.

13. The method of claim 1, further comprising obtaining the response spectrum for the volume of interest.

14. The method of claim 13, wherein obtaining the response spectrum for the volume of interest further comprises making radiation measurements using the radiation detector.

15. The method of claim 1 further comprising conducting further operations in the formation in dependence upon the enhanced gamma ray spectrum.

16. The method of claim 15 wherein the further operations comprise at least one of: i) geosteering; ii) drilling at least one borehole in the formation; iii) performing measurements on the formation; iv) estimating at least one parameter of interest of the formation; v) installing equipment in a borehole in the formation; vi) evaluating the formation; vii) optimizing development in the formation; viii) optimizing development in a formation related to the formation; ix) optimizing exploration in the formation; x) optimizing exploration in a formation related to the formation; xi) producing at least one hydrocarbon from the formation.

17. The method of claim 1 wherein the at least one contrast sharpening mask comprises at least a low pass smoothing mask subtracted from a unity mask which when applied to the response spectrum obtains high-frequency data and adds the high-frequency data to the response spectrum.

18. The method of claim 1 comprising selecting the at least one contrast sharpening mask in dependence upon scintillator resolution.

* * * * *